W. S. SAUNDERS.
SAWING-MACHINE.

No. 175,382.   Patented March 28, 1876.

WITNESSES:
Francis McArdle,
John Goethals

INVENTOR:
W. S. Saunders
BY
Munn & Co
ATTORNEYS.

UNITED STATES PATENT OFFICE.

WILLIAM S. SAUNDERS, OF ATLANTA, MISSOURI.

IMPROVEMENT IN SAWING-MACHINES.

Specification forming part of Letters Patent No. 175,382, dated March 28, 1876; application filed March 6, 1876.

*To all whom it may concern:*

Be it known that I, WILLIAM SILAS SAUNDERS, of Atlanta, in the county of Macon and State of Missouri, have invented an Improvement in Sawing-Machines, of which the following is a specification:

My invention consists of a portable sawing-machine containing crank and band wheel contrivance for working the saw by a crank and pitman; the essential feature of which is a ground-hook and log-hook for holding and fastening the log, also a helper for holding small sticks, and also a shaft and truck wheel contrivance to facilitate the moving of the machine from place to place.

Figure 1:
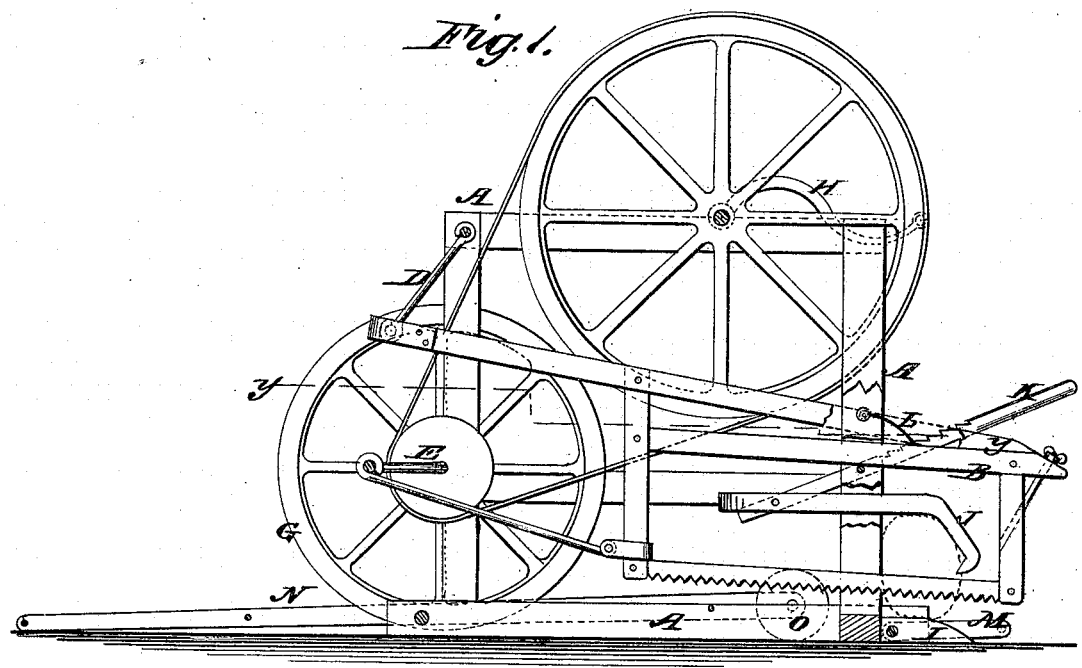
Figure 2:
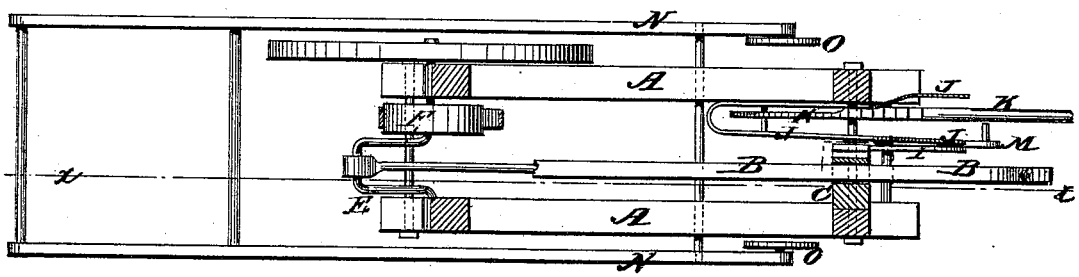

Figure 1 is a longitudinal sectional elevation of my improved machine, taken on line $x$ $x$ of Fig. 2. Fig. 2 is a horizontal section, taken on line $y$ $y$ of Fig. 1.

Similar letters of reference indicate corresponding parts.

A is a light portable frame, in which is a saw-frame, B, working in suitable guides C, and on the swinging support D, also crank-shaft E, driving-pulley F, and balance-wheel G, for working the saw by hand-crank H, or by power. The saw projects beyond the front end of the machine, from which also projects a ground-hook, I, to be forced under the logs, or on which the logs are to be rolled and fastened by the dog J and lever K, the latter being fastened by the pawl L, and for small sticks the helper M is applied, so as to be engaged by the dog and swing up to press and bind several sticks at once against the frame. The frame is mounted on the shafts N and truck-wheels O for being moved about from place to place, the arrangement being such that when the shafts are let down on the ground the frame of the machine rests on its base, and the raising of the shafts lifts the machine upon the wheels O.

Having thus described my invention, I claim as new and desire to secure by Letters Patent—

1. The combination, with the saw-frame and the gear for operating it, of the ground-hook I, dog J, and the lever K, substantially as specified.

2. The combination of helper M with the frame A, saw B, dog J, and the lever K, substantially as specified.

3. The truch-wheels O and shafts N, combined and arranged with the frame A and the sawing mechanism, substantially as specified.

WILLIAM SILAS SAUNDERS.

Witnesses:
JOHN CLARK DUNNINGTON,
ROBERT J. SINCLAIR.